United States Patent [19]
Pall et al.

[11] Patent Number: 5,919,330
[45] Date of Patent: Jul. 6, 1999

[54] METHOD FOR BONDING A POROUS MEDIUM TO A SUBSTRATE

[75] Inventors: David B. Pall, Roslyn Estates; Brian T. Muellers, Rockville Centre, both of N.Y.

[73] Assignee: Pall Corporation, East Hills, N.Y.

[21] Appl. No.: 08/874,438

[22] Filed: Jun. 16, 1997

Related U.S. Application Data

[60] Continuation of application No. 08/449,275, May 24, 1995, abandoned, which is a division of application No. 08/038,257, Mar. 24, 1993, Pat. No. 5,458,719.

[51] Int. Cl.⁶ .............................. C09J 5/00; B32B 31/24
[52] U.S. Cl. .................... 156/305; 156/308.6; 156/309.3
[58] Field of Search ...................... 156/155, 278, 156/285, 305, 308.6, 309.3; 210/445, 446, 500.38, 500.41, 506, 508; 264/257, 510, 511; 118/50

[56] References Cited

U.S. PATENT DOCUMENTS

| | | |
|---|---|---|
| 3,494,470 | 2/1970 | Danfield . |
| 3,544,384 | 12/1970 | Sundberg et al. . |
| 3,578,175 | 5/1971 | Manjikian . |
| 3,663,326 | 5/1972 | Wanesky . |
| 3,730,353 | 5/1973 | Trasen et al. . |
| 3,791,526 | 2/1974 | Stana et al. . |
| 3,950,255 | 4/1976 | Ishii et al. . |
| 3,953,566 | 4/1976 | Gore . |
| 4,096,227 | 6/1978 | Gore . |
| 4,131,664 | 12/1978 | Flowers et al. . |
| 4,181,549 | 1/1980 | McPhee ................................. 156/305 |
| 4,187,182 | 2/1980 | Rosenberg . |
| 4,311,661 | 1/1982 | Palmer . |
| 4,340,479 | 7/1982 | Pall . |
| 4,341,615 | 7/1982 | Bachot et al. . |
| 4,347,208 | 8/1982 | Southall . |
| 4,501,663 | 2/1985 | Merrill . |
| 4,666,549 | 5/1987 | Boultinghouse . |
| 4,774,132 | 9/1988 | Joffee et al. . |
| 4,786,351 | 11/1988 | Elliott et al. ............................. 264/101 |
| 4,802,982 | 2/1989 | Lien . |

(List continued on next page.)

FOREIGN PATENT DOCUMENTS

| | | |
|---|---|---|
| 304207 | 2/1989 | European Pat. Off. . |
| 365112 | 4/1990 | European Pat. Off. . |
| 513796 | 5/1990 | European Pat. Off. . |
| 0513392 | 11/1991 | European Pat. Off. . |
| 63-240918 | 10/1988 | Japan . |

OTHER PUBLICATIONS

WPI/Derwent English language abstract of JP 60–139302, AN 85–219343, 1985.
Patent Abstracts of Japan, English language abstract of JP 60–139302, vol. 9, No. 301, Nov. 1985.
WPI/Derwent English language abstract of TW 267949, AN 96–138452, 1996.
Rangarajan et al.; *Desalination*, "Development of Fabric Reinforced Polysulfone Membranes", Elsevier Science Publishers, No. 1, Amsterdam, NL, Nov. 1991, pp. 81–92.
*Materials in Design Engineering*, "Joining and Fastening Plastics", Manual No. 145, Malcolm W. Riley, Jan. 1958, pp. 129–139.
Plastics Engineering Handbook, 3rd Edition, A.F. Randolph, 1960, pp. 479–491.

*Primary Examiner*—Richard Crispino
*Attorney, Agent, or Firm*—Leydig, Voit & Mayer, Ltd.

[57] ABSTRACT

A method for bonding a porous medium to the surface of a solid substrate is disclosed. The method comprises contacting a dry porous medium with a dry surface of a substrate and impregnating the porous medium with a bonding composition. The impregnated porous medium is maintained in contact with the substrate surface until the substrate surface is at least slightly dissolved in the bonding composition without dissolving the porous medium. At least a portion of the bonding composition is flushed through the impregnated porous medium towards the substrate and subsequently away from the surface of the substrate. The bonding composition is then evaporated at a controlled rate from the substrate and the porous medium.

28 Claims, 2 Drawing Sheets

U.S. PATENT DOCUMENTS

| | | | |
|---|---|---|---|
| 4,906,372 | 3/1990 | Hopkins . | |
| 4,937,024 | 6/1990 | Hickson | 264/101 |
| 4,942,013 | 7/1990 | Palmer et al. . | |
| 5,017,292 | 5/1991 | DiLeo et al. . | |
| 5,108,691 | 4/1992 | Elliott | 264/101 |
| 5,110,682 | 5/1992 | Bonazza | 156/308.6 |
| 5,143,616 | 9/1992 | Pall et al. . | |
| 5,259,894 | 11/1993 | Sampson | 156/305 |
| 5,273,694 | 12/1993 | Perusich et al. | 264/331.14 |
| 5,275,725 | 1/1994 | Ishii et al. . | |
| 5,458,719 | 10/1995 | Pall et al. . | |

METHOD FOR BONDING A POROUS MEDIUM TO A SUBSTRATE

This disclosure is a continuation of U.S. patent application Ser. No. 08/449,275, filed May 24, 1995, now abandoned, which is a division of U.S. patent application Ser. No. 08/038,257, filed Mar. 24, 1993, U.S. Pat. No. 5,458,719.

TECHNICAL FIELD OF THE INVENTION

The present invention relates to a method of forming a composite structure. More specifically, the invention relates to a method for bonding a porous medium to the surface of a substrate.

BACKGROUND OF THE INVENTION

Porous media are bonded to the surface of a substrate for a wide variety of purposes. For many applications, such as the formation of a resilient or acoustically absorptive surface, neither the nature of the material which accomplishes the bond nor the depth to which the bond penetrates the porous facing is critical.

For a wide range of other applications, such as the purification of pharmaceutical fluids or the removal of bacteria from foods, e.g., milk and beer, bonded assemblies which include finely porous filter media secured to a solid substrate are used. Secure bonding of the porous medium to a solid substrate is particularly necessary when the porous medium is exposed during service to very high shear forces which would disrupt an unsupported membrane.

Filtration applications also typically require that the porous medium is bonded to the substrate such that the fluid passing through the membrane is provided with passageways through which it can flow as it issues from the membrane. Typically, the passageways are grooves cut or cast into a plane surface, the grooves being configured to drain collectively into a central outlet port, which the user connects to a receiver for the filtrate.

The porous medium may be secured to the substrate by applying a layer of a viscous adhesive to the substrate and then contacting the porous medium with the adhesive layer. The use of a third component which could leach into the filtrate, i.e. the adhesive, is very undesirable for many of the applications described above. In addition, the adhesive can often blind a substantial number of the pores and alter the permeability of the medium.

Bonded assemblies may also be produced by contemporaneously forming and integrally securing a porous medium to the surface of a substrate. This method, however, is severely limited by the requirement that the porous medium be precipitated from a liquid suspension and secured to the substrate in a single step. Some porous media, which may be employed effectively in filter applications, are not formed from liquid suspension. For example, polytetrafluoroethylene (e.g. Teflon® TFE) is typically made as a powder, which is then extruded to form a sheet, and the sheet is biaxially stretched to form a porous membrane.

A filter membrane may also be secured to a substrate by a method which involves the application of a solvent to which the filter membrane is inert, but which dissolves the substrate. The filter membrane is saturated with the solvent, and then contacted with the substrate. The contact of the saturated membrane with the substrate dissolves a portion of the substrate, which is then integrally secured to the membrane after the solvent is removed. This method has the severe fault that it may be extremely difficult to maintain a uniform distribution of solvent throughout the filter membrane at the time it is applied to the substrate. Simple dipping, or any procedure involving manipulation of the wet membrane, invariably leaves more solvent in some portions of the membrane than in others. As a result, an excessively thick bond may form in some areas of contact, while in other areas the bonding between the membrane and the substrate may be inadequate.

For many if not most applications, it is important that the membrane be positioned precisely on a specific location on the substrate. This is difficult to do, because the prewetted membrane quite generally is limp, i.e. has no rigidity, and this difficulty is compounded by the rapid evaporation of the solvent, such that a significant loss of solvent can occur in a few seconds.

Further, in the process described above, the solvent is typically allowed to evaporate during the dissolution and bonding process. The space within any grooves, which may be present in the substrate, is rapidly saturated by the vapor from a small fraction of the solvent and, thus, the bulk of the evaporation takes place at the exposed surface of the filter membrane. As solvent evaporates from the exposed surface, solvent from the remainder of the filter membrane migrates by capillarity through the membrane to the exposed surface. Accordingly, the solvent originally located in contact with the substrate, which contains dissolved substrate in solution, also evaporates from the exposed membrane surface. In the process, dissolved substrate may be deposited at the exposed surface of the filter membrane. This is highly undesirable, as the pores of the membrane may be at least partially clogged by the deposited substrate, locally altering the pore size and decreasing the permeability of the membrane.

SUMMARY OF THE INVENTION

An object of the present invention is to overcome the drawbacks described above.

One aspect of the present invention provides a method for bonding a porous medium to a substrate which includes contacting a porous medium with a surface of a substrate, preferably when both the porous medium and the substrate surface are dry; impregnating the porous medium with a bonding composition, which preferably comprises two chemical species having controlled relative vapor pressures, the bonding composition at least slightly dissolving the substrate surface without dissolving the porous medium; maintaining the impregnated porous medium in contact with the substrate surface, preferably with no loss of solvent by evaporation, until the substrate surface is at least slightly dissolved in the bonding composition; flushing at least a portion of the bonding composition through the impregnated porous medium toward the substrate and subsequently away from the surface of the substrate; and evaporating the bonding composition, preferably at a controlled rate from the substrate and the porous medium.

This aspect of the present invention may include impregnating the porous medium with a bonding composition comprising a first chemical species, which is a solvent for the substrate, and a second chemical species which is not a solvent for the substrate (non-solvent species). Preferably neither the first chemical species nor the second chemical species is a solvent for the porous medium. The chemical species are selected such that during the controlled evaporation step the first chemical species evaporates faster than the second chemical species.

Another aspect of the present invention provides a method for bonding a porous medium to a substrate which includes contacting a porous medium with a surface of a substrate; impregnating the porous medium with a bonding composition, the bonding composition including a first chemical species which is a solvent for the substrate and a second chemical species which is a non-solvent for the substrate; maintaining the impregnated porous medium in contact with the substrate surface until the substrate surface is at least slightly dissolved in the bonding composition; passing at least a portion of the bonding composition through the impregnated porous medium towards the substrate and subsequently away from the surface of the substrate to remove bonding composition containing dissolved substrate from a portion of the porous medium, and evaporation the bonding composition from the substrate and the porous medium.

The embodiments of the invention represent a considerable advance in the state of the art. As indicated above, composite structures are conventionally formed by processes which either may not permit a preformed porous medium to be secured to a substrate or in securing the porous medium to the substrate, may substantially alter the porosity or permeability of the medium. The present invention provides a method of producing a bonded structure which includes only the filter membrane and the substrate, thereby avoiding the use of a component which could leach into filtrate. Further, this invention affords a method of integrally securing a preformed porous medium, such as a polytetrafluoroethylene membrane, to a substrate. In addition, the present invention provides a method of integrally securing a porous medium to a substrate in a manner that does not substantially alter the pore structure or decrease the permeability of the medium. This invention also permits a filter membrane to be bonded to a substrate with minimal obstruction of edgewise flow through those portions of the membrane immediately adjacent the bond.

These and other objects and advantages of the present invention will be apparent from the description of the invention which follows.

DETAILED DESCRIPTION OF THE INVENTION

Figure 1:
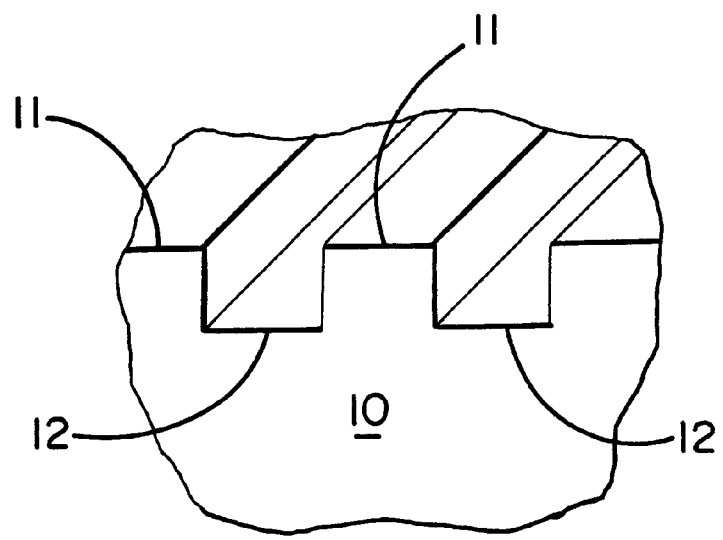
FIG. 1 is a perspective view of a section of a substrate of the present invention cut perpendicular to grooves in the substrate surface.

The present invention provides a method for bonding a porous medium to a surface of a substrate to form a composite structure. More particularly, the present invention is directed to a method of integrally securing a porous filter medium to the surface of a substrate.

The substrate may be any member having sufficient structural integrity to support the porous medium. The substrate, which provides support for and defines the configuration of the porous medium, may be flexible, semiflexible or rigid. Further, the substrate includes a material which at least slightly dissolves in and is solvated by (i.e. absorbs and is softened by) the bonding composition. For example, the substrate preferably includes a polymeric material, such as a polyethersulfone, a polysulfone or a polyamide.

The substrate may be a solid structure. If the purpose of the composite structure is to act as a filter, the substrate includes a mechanism for draining fluid away from the substrate surface. The drainage mechanism may include a plurality of channels, passages, or interconnecting pores in the substrate surface. In the illustrated embodiment, the drainage mechanism includes at least one groove and preferably a plurality of grooves, which may be interconnected, in the substrate surface. Typically, the grooves are in fluid communication with a filtrate outlet port, which may be coupled to a receiver for filtrate passing through the porous medium.

The porous medium is preferably a porous structure that may be employed as a filter medium. The porous medium is preferably formed from a polymeric resin but may include any material capable of forming a porous structure. The porous medium may comprise any one of a number of materials, including fibrous media made by a variety of means including melt blowing, Fourdrinier deposition, or air laying. The porous medium may also comprise porous membrane media made by a variety of means including (i) introducing a solution of a resin in a relatively good solvent into a solution which is a relatively poor solvent for the resin, e.g., as described in U.S. Pat. No. 4,340,479, (ii) by preparing a solution of a resin in a mixture of two solvents, one of which is a better solvent with a relatively higher vapor pressure compared with the second solvent, and allowing the solvents to evaporate, thereby forming a porous film, or (iii) as in the case of Teflon membranes, by precipitating a suspension of finely particulate PTFE, which is then hot compressed to form a sheet in which the particles are bonded to each other, followed by stretching the sheet to form the membrane. In a preferred embodiment, the porous medium may comprise a microporous filter medium, such as a microporous fibrous matrix or a microporous membrane. The method of this invention is particularly useful for securing a microporous filter medium to a substrate.

Exemplary porous media may include a fluoropolymer, a polyamide, a polyethersulfone, an acrylic, a polyester, or a cellulose ester. Preferably, the porous medium includes poly(vinylidene difluoride), polytetrafluoroethylene or a nylon, such as nylon-46, nylon-6, nylon-66 or nylon-610. For example, microporous filter media may be prepared using polyamides following the procedure of U.S. Pat. No. 4,340,479, using poly(vinylidene difluoride) following the procedure of U.S. Pat. Nos. 4,341,615 and 4,774,132, using polytetrafluoroethylene following the procedure of U.S. Pat. Nos. 3,953,566 and 4,096,227, using a polyethersulfone following the procedure of U.S. Pat. No. 5,480,554.

Figure 2:
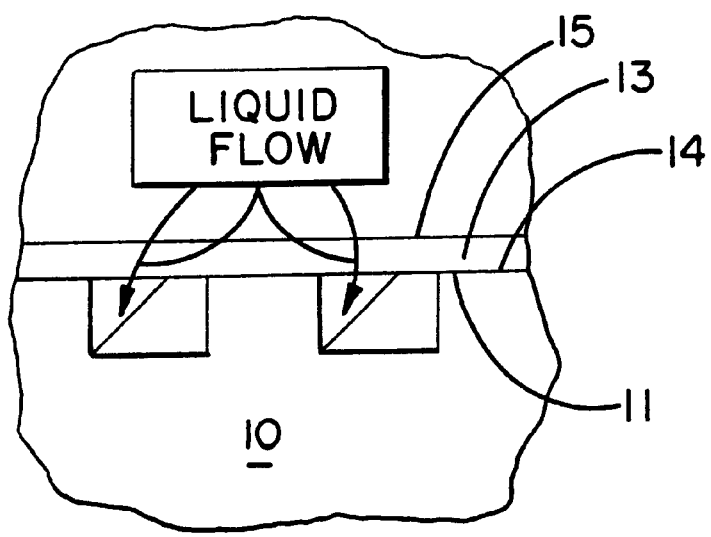
FIG. 2 is an oblique view of a section of the substrate of FIG. 1.

As shown in FIG. 1, the portion of the substrate 10 between adjacent grooves 12 is referred to hereinafter as the crest 11. The grooves 12 may have any suitable configuration, such as a semicircular configuration, a V-shaped configuration or the generally U-shaped configuration shown in FIG. 1. Similarly, the crests 12 may have a variety of configurations, such as the apex of the angle between closely-spaced V-shaped grooves or, more preferably, a flat planar surface between more widely spaced grooves. The crests 11 constitute much of the substrate surface to which the porous medium 13 is secured. As shown in FIG. 2, the present method integrally secures the membrane 13 to the substrate surface by forming a bond 14 between the crests 11 and the porous medium 13. Preferably, the depth of penetration of the bond 14 is a very small fraction of the thickness of the porous medium 13, as this permits the portion of the porous medium above the crests 11 to function effectively by allowing edgewise flow. This is particularly true of the most common type of filtration, during which all or most of the collected contaminant is caught on or very near to the exposed surface 15 of the porous medium 13 (i.e., the surface of the porous medium which is not bonded to the substrate surface). The purified filtrate then flows edgewise through the porous filter medium 13, as shown in FIG. 2.

One embodiment of the present invention comprises a method for bonding a porous medium to a substrate which includes contacting a porous medium with a surface of a substrate, preferably when both the porous medium and the substrate surface are dry. The dry porous medium is then impregnated with a bonding composition, which at least slightly dissolves the substrate surface without dissolving the porous medium.

The impregnated porous medium is maintained in contact with the substrate surface until the substrate surface is at least slightly solvated by or slightly dissolved in the bonding composition. Preferably, the characteristics of the bonding composition are selected or adjusted to obtain a satisfactory degree of adhesion during a hold period of at least about 15 to 25 seconds. ("Hold period" refers to the time during which the impregnated medium 29 is maintained in contact with the substrate 41 prior to flushing.) Shorter hold periods may be used but may lead to difficulties in reproducibility. Still longer hold periods, such as from about 100 to about 150 seconds, are more preferred to further aid reproducibility. Even longer hold periods may also be used.

The volume of liquid bonding composition contained within the porous medium is the apparent volume of the porous medium (i.e. its area multiplied by its thickness) multiplied by the fraction of its volume which constitutes the pores. Denoting this volume as V, in a preferred embodiment of this invention, the method is carried out in an apparatus which is designed to contain adjacent to the porous medium a volume of the bonding composition that is at least equal to the volume V and, more preferably, a volume of about one to thirty times the volume V. This volume of bonding composition is preferably contained within the voids volume of a porous element. The porous element may comprise a porous pad, which is in contact with the porous medium. The porous pad may include a compressible, porous material, which is inert to the bonding composition. The compressible, porous material may, for example, comprise one or more layers of a melt blown fibrous web. In a still more preferred version of the apparatus, a further portion of the excess bonding composition is contained within a highly liquid permeable structure in physical contact with the pad, the structure being such as to allow rapid flow of the contained bonding composition through the pad and the porous medium with low pressure drop; the highly liquid permeable structure may for example comprise one or more layers of metal and/or plastic woven mesh.

In another embodiment of the invention, the highly liquid permeable structure is placed upon a source of the bonding composition, the compressible pad is placed on the highly liquid permeable structure, the porous medium in a dry condition is then placed on the compressible pad, the substrate is placed with its grooved face in contact with the porous medium, and the resulting assembly is contained within a closed container. The bonding composition is then introduced into the highly liquid permeable structure, thereby saturating the compressible pad and the porous medium, which in turn wets the contacted face of the substrate.

In a more preferred embodiment, pressure is applied to force the highly liquid permeable structure, the pad, the porous medium, and the substrate together, thereby compressing the pad and assuring that the porous medium is in firm contact with the substrate.

In a still more preferred embodiment, as soon as the desired hold period between the porous medium and the substrate has been reached, the bonding composition contained in the highly liquid permeable structure and in the pad is rapidly flushed through the porous medium, preferably in the direction of the substrate and out of the apparatus via the grooves of the substrate, either by applying air or other gas pressure to the highly liquid permeable structure, or by applying vacuum to the side of the porous medium in contact with the substrate, e.g., by applying vacuum to the substrate outlet port. The application of pressure or vacuum may then be continued until the now bonded structure is dry (i.e., residual bonding composition has been evaporated), in the one case by evaporation into the introduced air, in the other by evaporation of the solvent. Alternatively, the residual bonding composition may be evaporated by applying a vacuum to the substrate and the porous medium.

The rapid flushing of bonding composition through the porous medium towards the substrate is beneficial, as it removes bonding composition containing dissolved substrate from the portion of the porous medium not in contact with the substrate. Allowing dissolved substrate to remain in place could partially obstruct flow in the this portion of the porous medium.

Figure 3:
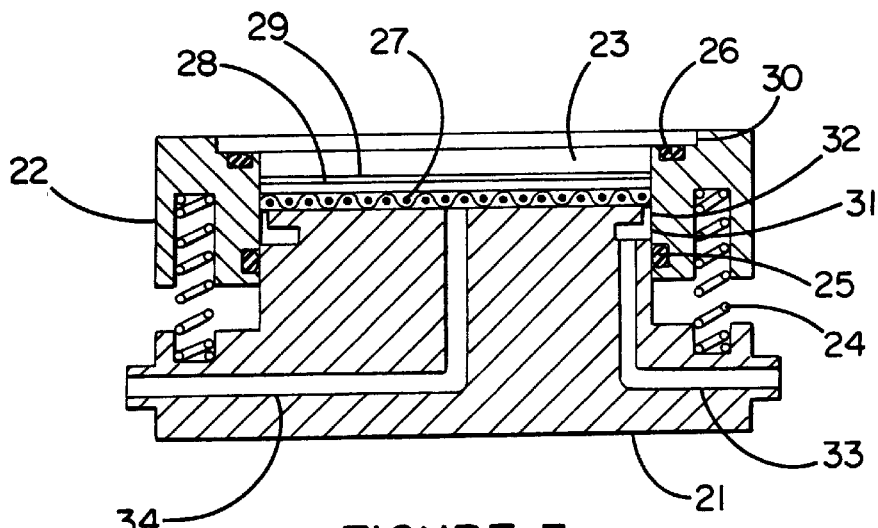
FIG. 3 is a cross-sectional view of a portion of an apparatus shown in FIG. 4.
Figure 4:
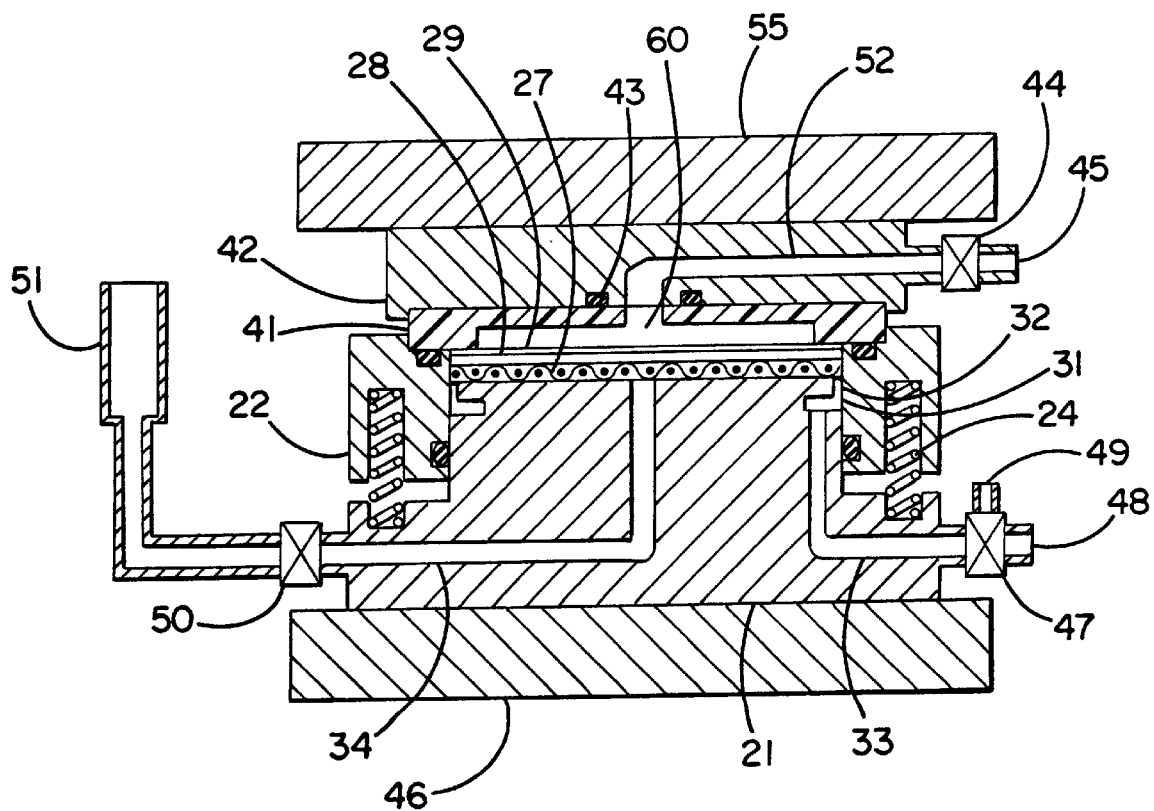
FIG. 4 is a cross-sectional view of an apparatus which may be used to carry out a method according to the present invention.

An apparatus for carrying out a preferred embodiment of the present invention is shown schematically in FIGS. 3 and 4. FIG. 3 represents a portion of the apparatus which is shown more completely in FIG. 4. In FIG. 3, a base 21 cooperates with an upper member 22 to form a sealable chamber or cavity 23. The upper member 22 is located vertically by springs 24, which are shown in their fully extended position. A first elastomeric O-ring 25 provides a sliding seal between the base 21 and the upper member 22, and a second elastomeric O-ring 26 is configured to provide a seal to the outer rim of the grooved substrate 41 (as shown in FIG. 4).

In a preferred mode of operation, a highly liquid permeable structure 27, of which a preferred form is a woven wire or plastic mesh, is placed in the cavity 23, followed by a compressible pad 28, and then in turn by the porous medium 29. An upper portion of the inner periphery 30 of the upper member 22 is shaped to accept the outer contour of the substrate 41 and a lower portion of the inner periphery 30 is shaped to accept the outer contour of the porous medium 29, assuring accurate register between the grooves of the substrate 41 and the porous medium 29. For example, the inner periphery 30 of the upper member 22 may be contoured to a D-shaped substrate and a smaller D-shaped porous medium. A grooved section 31 extends 360° around the portion of the base 21 above the second O-ring 26. The groove 31 is connected to an annular passage 32 which communicates with the highly liquid permeable structure 27 and which may generally be about 0.003" to 0.006" in width and about 0.2–0.5" long extending 360° around the base 21. The groove 31 is connected also to a flow passage 33. A second flow passage 34 connects the center of the upper face of the base 21 to a port located on the outer face of the base 21.

FIG. 4 represents an exemplary assembled apparatus ready for use to accomplish the bonding of a porous medium 29 to a grooved substrate 41. In FIG. 4, the substrate 41 is placed with its grooved face down onto the upper member 22. An adaptor 42 together with a seal 43 are placed on the substrate 41. The adaptor 42 contains a passageway 52 connecting the outlet port 60 of the substrate 41 to a valve 44. The outlet 45 of the valve 44 is connected to a source of vacuum, such as a vacuum pump. The base 21 and the adapter 42 have been placed between the lower platen 46 and the upper platen 55 of a press. Sufficient force is applied by the press to compress springs 24 and thereby to bring the porous medium 29 into close contact with the grooved face of the substrate 41. Preferably, the pressure is further increased to apply a force in the range of about 10 to 50 pounds per square inch of area of the substrate 41, in the process reducing the thickness of the compressible pad 28 to about 50 to 80% of its starting thickness. A three way valve 47 is connected to the flow passageway 33. A first port 48 of the valve 47 is connected to a reservoir containing the liquid bonding composition, which is maintained at a pressure of about 15 to 50 pounds per square inch. A second port 49 of the valve 47 is connected to a source of vacuum, such as a vacuum pump. A valve 50 is connected to the flow passageway 34, between the base 21 and an open-topped transparent-walled vessel 51. The mid point of the vessel 51 is preferably located vertically about 5 to 10 inches above the level of the porous medium 29.

In a preferred embodiment of the present invention, the apparatus shown in FIGS. 3 and 4 is operated in a four stage procedure described in sections A to D below.

A. Filling the apparatus with the bonding composition

A valve 47 is opened to the first port 48, allowing the liquid bonding composition to pass through the passageway 33 to the groove 31, which it fills within about one second. The liquid bonding composition then flows in a nearly uniform stream through the full 360° of the annular passage 32 into the outer periphery of highly liquid permeable member 27, thence through the pad 28, where it is rapidly absorbed by the porous medium 29, which then wets the surfaces of the substrate 41 that are in contact with the porous medium 29. An excess of the fluid bonding composition is allowed to pass through the passageway 34 and the valve 50 into the vessel 51 until the vessel 51 is filled to a level about 5 to 10 inches above the porous medium 29, at which time the valve 47 is closed. If the vapor pressure of the bonding composition is above about 10 mm of mercury, the net effect of the increase in pressure, induced due to the vapor pressure of the bonding composition and the 5" to 10– liquid head in vessel 51, is to increase the amount of gas confined within the passageway 52 of the adapter 42 and in the grooves of the substrate 41. This increase in the amount of confined gas typically prevents the liquid bonding composition from penetrating into the grooves of the substrate 41. The penetration into the grooves to a small portion of their depth may, however, be acceptable in practice.

The filling step is preferably done as quickly as possible, for example, in no more than about 15 seconds and, more preferably, in no more than about 5 seconds, from the opening of the valve 47 to the time the liquid bonding composition in the vessel 51 reaches the desired level.

It should be noted that the transparent-walled vessel 51 serves a dual function; first, the vessel maintains a differential pressure of a few inches of liquid volume; and second, the vessel acts as a reservoir from which bonding composition may be drawn to thoroughly impregnate the porous medium 29 in contact with the substrate 41.

B. Time interval during which contact is maintained between the impregnated porous medium and the substrate The time during which the impregnated porous medium 29 is maintained in contact with the substrate 41 prior to flushing (herein the "hold period") is an important aspect of the process. During the hold period the bonding composition diffuses into the substrate 41, causing the outer surface of the substrate 41 in contact with the impregnated porous medium to soften and become tacky. In essence, this outer surface of the substrate 41 may be converted into an adhesive, bonding layer.

At the same time, some of the substrate 41 dissolves in the bonding composition. At least a portion of this dissolved substrate diffuses through the bonding composition within the porous medium 29.

The optimum duration of the hold period is determined empirically for a specific bonding composition. For example, the final composite structure may be tested by passing water therethrough in the normal flow direction (i.e., from the porous material to the substrate) in order to determine what percentage of the permeability of the porous medium 29 has been lost. This percentage becomes higher as the hold period is increased. The composite structure may also be tested by flowing water in the reverse direction, in order to determine the pressure at which the porous medium 29 separates from the substrate 41. Several specimens can be made using a given bonding composition and various hold periods. The test data derived from these specimens may then be used to select an optimum hold period.

The optimum hold period varies greatly depending on the particular chemical species used to prepare the bonding composition. The bonding composition may be compounded using a combination of an aggressive chemical species, i.e., a chemical species which is a good solvent for the substrate (first chemical species), with a chemical species which is a non-solvent for the substrate (second chemical species). The degree of solvency of the substrate in the bonding composition, and hence the hold period required, may be adjusted by varying the proportions of the two components. Using such a combination is a preferred feature of the present invention.

During the filling operation, some parts of the porous medium 29 and the substrate 41 are unavoidably wetted by the bonding composition before other parts. For example, if the substrate and porous medium being bonded are quite large, some parts may be exposed for as much as 15 seconds or more longer than other parts. If the bonding composition is selected or compounded such that the hold period is about 15 seconds, then some parts of the porous medium 29 in contact with the substrate 41 may have been exposed for twice as long as others. This may lead to overbonding of one section of the resulting composite structure with flow of liquid through the filter in service inhibited locally, while another section may fail in the reverse pressure mode.

It is a feature of this invention that the bonding composition may comprise a mixture of chemical species which makes possible relatively longer hold periods. As noted above, the advantage of longer hold periods is that the effect of the differential wetting which can occur during the filling operation is minimized. When compared, for example, with the same 15 second wetting differential of the example of the preceding paragraph, the use of a mixture of chemical species composition for which bonding is optimized by a 150 second hold period reduces the difference between the longest and shortest total time during which any part of the substrate is in contact with the impregnated porous medium prior to flushing to about 10% of the hold period.

C. Flushing dissolved substrate out of the membrane

Another feature of the present invention is the removal, prior to drying, of the bulk of the dissolved substrate which has diffused into the bonding composition within the porous medium 29 during the preceding step.

In step C of this procedure, the undesired dissolved substrate within the porous medium 29 at the termination of the hold period is removed by closing the valve 50 between the vessel 51 and the base 21 and opening the valve 44 at the adapter 42 to a vacuum source 45 for about 1 to 5 seconds. This flushes the liquid bonding composition contained in the two layers 27 and 28 through the porous medium 29 in the direction of the substrate 41 and away from the surface of the substrate 41 through the grooves or pores in the substrate 41 and along the passage 52 in the adapter 42. Flushing with this controlled quantity of the bonding composition is sufficient to remove the dissolved substrate from porous medium 29, while having a negligible effect on the viscous material which has formed a bond between the substrate 41 and the porous medium 29.

D. Evaporation of residual bonding composition from the porous medium and the substrate In the fourth stage D, the bonding composition is removed by evaporation. As in stage A, it is desirable to reduce as much as possible differences in exposure time in this stage between one part of the bonded surface and another.

In the process of the present invention, this may be accomplished in part by applying a high degree of vacuum at the conclusion of the hold period, thereby rapidly removing the bonding composition by evaporation as the bonding composition is being flushed through the porous medium. The effectiveness of this procedure is, however, hampered by the absorption of heat during vaporization which cools the chemical species contained in the bonding composition, reducing their vapor pressure and the effective pumping rate.

A preferred feature of the present invention is the use as the bonding composition of a mixture of at least two chemical species, the first chemical species being a good solvent for the substrate and the second chemical species being a non-solvent for the substrate 41. The non-solvent species typically has a lower vapor pressure than the solvent species, preferably by about 10% or more at ambient temperature. Preferably, neither the solvent species nor the non-solvent species is a solvent for the porous medium. When vacuum is applied to the closed chamber 23 in step D, the solvent species is removed faster than the non-solvent species, thereby decreasing the concentration of the solvent species in the residual bonding composition in the closed chamber 23. Preferably, the starting constitution of the bonding composition is chosen such that the residual bonding composition becomes a non-solvent for the substrate 41 after a very short period of evaporation, thereby preventing any further dissolution of the substrate 41 and limiting the time during which dissolution of the substrate occurs to a very short period, which may be as short as about 5 seconds or less.

Exemplary chemical species which may be used as the solvent species include but are not limited to halogenated hydrocarbons, such as methylene chloride or chloroform. Preferably, the solvent species includes methylene chloride. Exemplary chemical species which may be used as the non-solvent species include but are not limited to alcohols and hydrocarbons. Preferably, the non-solvent species includes methanol, or cyclopentane. Exemplary bonding compositions for bonding a polyamide, a poly(vinylidene fluoride) or a polytetrafluoroethylene membrane to a polyethersulfone substrate include mixtures of methylene chloride as the solvent species and methyl alcohol as the non-solvent species or methylene chloride and polymethyl pentene as the non-solvent species.

Although the present invention has been described in terms of exemplary embodiments, it is not limited to these embodiments. Alternative embodiments, examples, and modifications which would still be encompassed by the invention may be made by those skilled in the art, particularly in light of the foregoing teachings. Therefore, the following claims are intended to cover any alternative embodiments, examples, modifications, or equivalents which may be included within the spirit and scope of the invention as defined by the claims.

We claim:

1. A method for bonding a porous medium to a substrate comprising:

contacting a porous medium with a surface of a substrate;

impregnating the porous medium with a bonding composition which at least slightly dissolves the substrate surface without dissolving the porous medium, the bonding composition including a first chemical species which is a solvent for the substrate and a second chemical species which is a non-solvent for the substrate;

maintaining the impregnated porous medium in contact with the substrate surface until the substrate surface is at least slightly dissolved in the bonding composition;

flushing at least a portion of the bonding composition through the impregnated porous medium towards the substrate and subsequently away from the surface of the substrate to remove bonding composition containing dissolved substrate from a portion of the porous medium; and evaporating the bonding composition from the substrate and the porous medium.

2. The method of claim 1 wherein contacting the porous medium and the substrate surface includes contacting a dry porous medium with the surface of the substrate.

3. The method of claim 1 wherein flushing the bonding composition comprises applying a vacuum to the side of the porous medium in contact with the substrate.

4. The method of claim 1 wherein evaporating the bonding composition comprises applying a vacuum to the substrate and the porous medium.

5. The method of claim 1 further comprising contacting the porous medium with a porous pad and wherein impregnating the porous medium with the bonding composition comprises applying the bonding composition to the pad and transferring at least a portion of the bonding composition from the pad to the porous medium.

6. The method of claim 5 wherein the porous pad includes a compressible, porous material, which is inert to the bonding composition.

7. The method of claim 5 further comprising contacting the porous pad with a highly liquid permeable structure and wherein applying the bonding composition to the pad comprises applying the bonding composition to the highly liquid permeable structure and transferring at least a portion of the bonding composition from the highly liquid permeable structure to the pad.

8. The method of claim 7 wherein the highly liquid permeable structure comprises metal woven mesh or plastic woven mesh.

9. The method of claim 7 wherein the total voids volume of the pad and the highly liquid permeable structure is at least about equal to the voids volume of the porous medium.

10. The method of claim 7 wherein the total voids volume of the pad and the highly liquid permeable structure is from about one and to about thirty times the voids volume of the porous medium.

11. The method of claim 1 wherein the second chemical species has a lower vapor pressure than the first chemical species.

12. The method of claim 11 wherein evaporating the bonding composition comprises applying a vacuum to the substrate and the porous medium, thereby removing the first chemical species more rapidly than the second chemical species such that the bonding composition no longer dissolves the substrate.

13. The method of claim 1 comprising impregnating the porous medium with a bonding composition, wherein the first chemical species includes methylene chloride or chloroform.

14. The method of claim 1 comprising impregnating the porous medium with a bonding composition, wherein the second chemical species includes methanol, cyclopentane or polymethyl pentene.

15. The method of claim 1 comprising contacting the porous medium with the substrate surface, wherein the substrate comprises a polyethersulfone and the porous medium comprises a polyamide, poly(vinylidene difluoride) or polytetrafluoroethylene.

16. The method of claim 15 comprising impregnating the porous medium with a bonding composition, wherein the substrate solvent species includes methylene chloride and the non-solvent species includes methanol or polymethyl pentene.

17. The method of claim 1 comprising contacting the porous medium with the substrate surface, wherein the substrate comprises a polyethersulfone, a polysulfone or a polyamide.

18. The method of claim 1 comprising contacting the porous medium with the substrate surface, wherein the porous medium comprises a polyamide, a fluoropolymer, a polyethersulfone, an acrylic, a polyester or a cellulose ester.

19. The method of claim 18 wherein the porous medium comprises nylon, poly(vinylidene difluoride) or polytetrafluoroethylene.

20. The method of claim 18 wherein the porous medium comprises nylon-46, nylon-6, nylon-66 or nylon-610.

21. The method of claim 1 comprising contacting the porous medium with the substrate surface, wherein the porous medium comprises a microporous filter medium.

22. The method of claim 21 wherein the microporous filter medium comprises a microporous fibrous matrix or a microporous membrane.

23. The method of claim 1 wherein flushing the bonding composition includes directing fluid away from the surface of the substrate through grooves in the substrate surface.

24. The method of claim 1 wherein flushing the bonding composition includes directing fluid away from the surface of the substrate through interconnecting pores in the substrate surface.

25. The method of claim 1 wherein the bonded porous medium retains porosity.

26. A method for bonding a porous medium to a substrate comprising:

contacting a porous medium with a surface of a substrate;

impregnating the porous medium with a bonding composition, the bonding composition including a first chemical species which is a solvent for the substrate and a second chemical species which is a non-solvent for the substrate;

maintaining the impregnated porous medium in contact with the substrate surface until the substrate surface is at least slightly dissolved in the bonding composition;

passing the bonding composition through the impregnated porous medium towards the substrate and subsequently away from the surface of the substrate to remove bonding composition containing dissolved substrate from a portion of the porous medium; and evaporating the bonding composition from the substrate and the porous medium.

27. The method of claim 26 wherein the bonded porous medium retains porosity.

28. The method of claim 26 wherein passing the bonding composition through the porous medium comprises flushing at least a portion of the bonding composition through the porous medium.

* * * * *